United States Patent [19]

Heinz, Jr.

[11] 4,020,241

[45] Apr. 26, 1977

[54] GALVANIC CELL HAVING A RESEALABLE VENT CLOSURE

[75] Inventor: Henry Heinz, Jr., Berea, Ohio

[73] Assignee: Union Carbide Corporation, New York, N.Y.

[22] Filed: Mar. 29, 1976

[21] Appl. No.: 671,674

[52] U.S. Cl. ............................ 429/54; 429/172; 429/173

[51] Int. Cl.² ........................................ H01M 2/12

[58] Field of Search ............... 429/53, 54, 55, 172, 429/174, 185, 171, 82, 86, 173

[56] References Cited

UNITED STATES PATENTS

| | | | |
|---|---|---|---|
| 2,060,799 | 11/1936 | Drummond | 429/172 |
| 2,289,249 | 7/1942 | Deibel | 429/54 |
| 3,256,117 | 6/1966 | Howatt et al. | 429/54 |
| 3,560,267 | 2/1971 | Guilliams | 429/54 |

Primary Examiner—Donald L. Walton
Attorney, Agent, or Firm—Cornelius F. O'Brien

[57] ABSTRACT

A galvanic cell, and a method for making it, having a resealable vent closure consisting of a resilient elastomeric sponge gasket disposed and compressed between the cover of the cell and the upper wall of the cell's container and designed such that gas buildup within the cell in the range of about 5 to 75 psi will vent along the cover-gasket interface and/or container-gasket interface.

16 Claims, 10 Drawing Figures

GALVANIC CELL HAVING A RESEALABLE VENT CLOSURE

FIELD OF THE INVENTION

This invention relates to sealed galvanic dry cells, and more particularly to a low pressure resealable vent for releasing excessive gas pressure from inside the dry cell. The invention also relates to a method for making galvanic dry cells having resealable vent closures.

BACKGROUND OF THE INVENTION

Galvanic cells may generate large quantities of gas under certain conditions during use. Since these cells are required to be tightly sealed at all times in order to prevent loss of electrolyte by leakage, high internal gas pressures may develop. Such pressures may cause leakage, bulging or possible explosion of the cell if not properly vented. If a vent valve is employed, it must be resealable in order to avoid drying out of the electrolyte over the life of the cell and to prevent ingress of oxygen from the atmosphere which can cause wasteful corrosion of the anode.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

Another type of resealable pressure relief vent valve that has been tried is that disclosed and claimed in U.S. Pat. No. 3,293,081 issued to J. L. S. Daley on Dec. 20, 1966. This resealable vent valve basically includes an annular seal gasket such as an O-ring which is maintained in sealing position around the periphery of the vent orifice by means of an arc shaped resilient member or spring. The resilient member or spring is designed to yield and permit radial movement of the seal gasket so as to momentarily break the seal and allow the passage of gas through the vent orifice when a predetermined high internal gas pressure is reached inside the cell.

Another type of resealable vent for dry cells consists of a metal ball overlying a vent opening and biased into sealing engagement around the vent opening by means of a coil spring. The vent opens to release gas from inside the cell when the internal gas pressure reaches a predetermined limit as set by the coil spring. Once the internal gas pressure has been relieved, the coil spring causes the ball to reseat and to reseal the vent.

Another type of resealable vent is disclosed in U.S. Pat. No. 3,415,690 to Richman issued on Dec. 10, 1968. In this vent, a flat elastomeric seal gasket overlies the vent opening and is retained in place by a resilient terminal cap on the top of the cell. This vent operates in basically the same manner as the vents previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. a retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the build-up of a predetermined high internal gas pressure inside the container so as to momentarily break the seal and allow gas to escape through the vent orifice.

A major problem encountered with resealable pressure relief vent valves of the types just described is that they are bulky and/or difficult to incorporate into the cell assembly. Furthermore, these pressure relief vent valves are expensive to manufacture and most are not adaptable for incorporation into miniature size cells. In addition, some of the prior art resealable vents as exemplified by the foregoing patents are not suitable for low pressure venting.

It is, therefore, an important object of this invention to provide a compact and economical low pressure resealable vent for use in a galvanic dry cell.

Still another object of this invention is to provide a resealable vent for galvanic dry cells which requires the very minimum number of parts and which is, therefore, easy to assemble and inexpensive to manufacture.

Another object of this invention is to provide a resealable vent that is adaptable to various diameters of drawn or extruded cell containers.

Another object of this invention is to provide a resilient elastomeric sponge gasket as the active member of a vent seal means for galvanic dry cells.

Another object of this invention is directed to a method for making a galvanic cell having a low pressure resealable vent closure.

The foregoing and additional objects will become more fully apparent from the following description and the accompanying drawings.

SUMMARY OF THE INVENTION

The invention relates to a low pressure resealable vent closure for galvanic cells. Specifically, in a galvanic cell comprising a container, such as an anode container or a container having an anode liner, having therein a cathode, a porous separator disposed between said anode and said cathode, an electrolyte disposed within said container and in contact with said anode and said cathode, and a cover for said container, the improvement comprising a gas-impermeable, resiliently compressible elastomeric sponge gasket compressed between the upper wall of the container and the cover.

The gasket should be sufficiently resilient such that gas buildup within the cell in the range of about 5 to 75 psi will provide a sufficient force to temporarily deflect or further compress the gasket at the gasket-container interface and/or gasket-cover interface thus enabling the gas to vent. When used in a galvanic dry cell employing a conventional type cathode collector rod, the gasket of this invention may be constructed with a suitable opening or aperture at its center for sliding over and in some cases maintaining contact with the cathode collector rod so as to effectively provide another venting path between the cathode collector rod and the gasket in addition to the venting paths between the gasket-container and gasket-cover interfaces. As shall be discussed below, one or more of these venting paths or selected areas of these venting paths may be permanently sealed so as to effectively direct the venting of gas from within the cell along preselected venting paths or areas.

The invention also relates to a method for making a galvanic dry cell having a low pressure resealable vent closure which comprises the steps:

a. placing within a container having a top open end and an inner disposed anode, a porous separator to contact the anode, a cathode depolarizer mix so as to be disposed within said separator, a cathode collector rod so as to be partially embedded within the center of the cathode depolarizer mix such that the rod projects above the top surface of the depolarizer mix, and an electrolyte;

b. preparing a gas impermeable resiliently compressible elastomeric sponge gasket having a central opening with a diameter equal to or larger than the diameter of the cathode collector rod and an outer diameter larger than the diameter of the container;

c. aligning the sponge gasket over the cathode collector rod and resting it on the top edge of the open end of the container;

d. preparing a cover having a central recess substantially equal to the diameter of the cathode collector rod and an outer diameter equal to the inner diameter of the container minus at most about two time the thickness of the sponge gasket;

e. placing the cover over the top of the container with the recess aligned with the cathode collector rod and then forcing the cover into the container thereby compressing the sponge gasket between the cover and the inner upper wall of the container; and f. crimping the top edge portion of the container over the sponge gasket.

Another method for making a galvanic dry cell having a low pressure resealable vent closure would comprise the steps:

a. preparing a raw cell by placing within a container having a top open end and an inner disposed anode, a porous separator to contact said anode, a cathode depolarizer mix so as to be disposed within said separator, a cathode collector rod so as to be embedded within the center of the cathode depolarizer mix such that the rod projects above the top surface of the depolarizer mix, and an electrolyte;

b. preparing a cover-gasket assembly by making a rigid cover with an outer side wall and a central recess substantially equal to the diameter of the cathode collector rod, coaxially securing to the lower portion of the cover a gas impermeable resiliently compressible elastomeric sponge annular gasket having a central opening with a diameter equal to or longer than the diameter of the central recess in the cover so as not to block the opening of said recess, and making the diameter of the outer side wall of the cover equal to the inner diameter of the container minus at most about two times the thickness of the sponge gasket;

c. placing the cover-gasket assembly over the top of the container with the cover recess aligned with the cathode collector rod and then forcing the cover-gasket assembly into the container thereby comprising the outer portion of the sponge gasket between the outer side wall of the cover and the inner upper wall of the container; and d. crimping the top edge portion of the container over the sponge gasket.

After the final step in the above methods, an additional step may be added whereby the top edge portion of the container is squeezed into the sponge gasket.

Preferably the outer diameter of the cover for use in the above methods should be equal to the inner diameter of the container minus about 1.0 to about 1.8 times the thickness of the sponge gasket so that in the fully assembled cell, the gasket could be further compressed so that the final thickness of the gasket between the cover and the container will be between 10% to 90% of the original uncompressed gasket thickness.

Commercial conventional cylindrical cells suitable for this invention, such as Lechanche dry cells, are of two main types. In the "pasted" cell, the cathode depolarizer mix is impact or pressure molded to form a cylindrical bobbin containing a central cathode collector rod. This bobbin is later inserted into a cylindrical anode container together with a flowable separator paste or colloidal mass which is cooked or otherwise gelled to form an immobilized separator member between the metal container and the mix bobbin. In the construction of bobbin type cells, a substantial amount of the total cell electrolyte is added by way of the separator paste.

In the "lined" cell, the separator is applied to the inside wall of the metal container either as an adherent film of coating or as an inserted layer of coated paper. The wet cathode mix is extruded or rammed into position to fill a major portion of the lined container and then the central cathode collector rod is inserted directly into the rammed mix or into a hole made by a piercing rod. In this construction, virtually all of the cell electrolyte is added by way of the wet mix, which is, therefore, much wetter than used to mold bobbins.

Consequently, since conventional cylindrical cells are of two types, step (a) in the methods above-described could be broken down into the following distinct sub-steps:

a'). placing a porous separator liner within and in contact with the upstanding wall of an anode container or an anode lined container having a closed bottom end and an open top end;

b'). dispensing a cathode depolarizer mix into the separator lined container to a level below the open top edge of the separator; and c'). embedding a cathode collector rod into the center of the cathode mix to a level such that the rod projects above the top surface of the cathode depolarizer mix.

As used herein, an elastomeric sponge gasket shall mean a gasket made of a cellular material having the properties of natural, reclaimed, vulcanized or synthetic rubber. Specifically, the material must be a gas impervious material having a structure which is composed of a large number of non-interconnected pores or closed-cells, be resilient, that is capable of contracting under a compressive force and then substantially recovering to its original dimensions upon release of the compressive force; and, for venting of gases in the range of 5–75 psi, the material should preferably have at least 50% pores and more preferably between about 65% and 90% pores in the structure. The gasket will have an apparent density which is decreased substantially from the real density of the solid base material by the presence of numerous cells or pores disposed throughout its mass. Consequently, in the trade these spongy materials are usually characterized by their uncompressed apparent density.

Suitable material for use in this invention include grades E 42 and E 43 of the closed cell expanded rubbers described in ASTM D–1056–68 which is incorporated herein by reference. Specific examples of material suitable for this invention include closed cell or pore neoprene (neoprene is the generic name for a synthetic rubber-like polymer made by polymerizing chloroprene [2-chloro-1,3-butadiene] or by polymerizing a mixture of polymerizable monomers, the major component of which is chloroprene), GR-S sponge rubber (standard GR-S is a copolymer of butadiene and styrene in the ratio of approximately 76.5 to 23.5 percent), sponge polyurethane, sponge butadiene, sponge nitrile rubber, sponge chlorosulfonated polyethylene, sponge ethylene-propylene terpolymer, butyl rubber, polyacrylates, etc. A process for making closed cell foam or sponge materials is described in Vol. 3, pages 82 to 110 of the Encyclopedia of Polymer Science and Technology, edited by Mark, Gaylord and Bikales and published by Wiley, 1965. This disclosure is incorporated herein by reference.

Of the above, closed cell neoprene has been found admirably suited for use in this invention. Although the composition of neoprene is as identified above, the term has been somewhat broadened through common usage and for the purpose of this invention to include commercial rubber-like compositions in which the major elastomeric constituent is neoprene.

The elastomeric sponge gasket for this invention must be resiliently compressible and preferably be of a cellular structure with at least about 50% pores, preferably between about 65% and 90% pores. This is necessary because contrary to gaskets of the prior art which were generally made of non-resilient materials, the gaskets of this invention have to be made of a resiliently compressible material so that when assembled in a cell as a resealable venting closure, gas buildup within the cell in the order of 5 psi and above will provide a sufficient force to effectively temporarily deflect or further compress the gasket at the gasket-container interface, gasket-cover interface and/or gasket-collector-rod interface so as to enable the gas to vent to the atmosphere. Once the gas pressure decreases, the resilient characteristic of the gasket will cause the gasket to return to its former compressed dimension thereby effectively resealing the cell. Thus the gasket will allow venting of gases from within the cell while preventing the ingress of gases from the atmosphere. The benefit of having a gasket made of a structure having a large number of noninterconnecting pores is that when the gasket is compressed due to an applied localized force, the resultant force will not be transmitted throughout the entire gasket structure but will be confined only to a small segment of the structure because the pores will provide space in which to absorb the material being compressed. This type of structure can generally be compressed or deflected at localized areas by the application of a small force or pressure. Thus closed cell resilient elastomers which are capable of being compressed by relatively small levels of pressure and which can return substantially to their original dimensions, are ideally suited as low pressure resealable vent closures for galvanic cells.

Some prior art metal cover members for cylindrical dry cells have functioned as resealable vents for relief of internal gas pressure by flexing upwardly away from thin fiber or paper seal gaskets acting a valve seats. The dimensional tolerances required for the component part or parts of this type of resealable vent construction is rather critical if a narrow range of venting pressures are required. Furthermore it is very difficult to achieve consistent venting in the low pressure range of 5–75 psi for example, with this type of resealable vent construction due to the fact that deflection of the cover varies little over a wide range of pressures. In the novel approach of the subject invention the metal or solid members are not required to deflect. Instead, a relatively soft resilient compressible gasket is the movable member which temporarily yields under pressure to vent internal gas. Thus by utilizing a material which varies widely in degree of compression for relatively small differences in pressure, i.e., one that exhibits a slight sloped curve on a load vs % compression graph, the need for close dimensional tolerances in assembly are eliminated.

Ideal materials for such gaskets are provided by closed cell foams or sponge materials available as sheet material in a range of thicknesses from about 1/16 inch (0.159 cm) upward (uncompressed). The materials are available in a range of densities (apparent density-uncompressed) which are linearly related to the % porosity. The surface of the material may be smooth or as cut, the latter showing a surface pebbling due to the cut surface pores. In the case of the rough surface material a fine pore size is preferred to prevent gas leakage. A grease sealant would be advisable when using as cut material.

Resilience of the foam or sponge is due mainly to the gas trapped in the closed cells. It is necessary, then, that the basic elastomer have low gas permeability, both to act as a seal member and to prevent gas from diffusing out of the pores. Low permanent set is required (e.g. 15% approximately) to insure continued resilience and resealability of the vent under extended compression.

In some types of galvanic dry cells of the prior art, the gaskets were generally made of non-resilient materials so as to enable liquid tight seals to be made between the covers and containers of the cells. The venting of gases from within these prior art cells usually occurred through joints, porous solids, slits or other type apertures placed in one or more of the components of the cell. If no such venting provisions were provided in the cells, then the internal gas pressure that could develop within the calls would either have to deflect or bulge the container or cover to create venting passages between these components and the non-resilient gasket or in some cases actually cause the cell to explode. As stated above, the resilient gasket material of this invention is sufficiently compressible and bulky so that it can be squeezed between the cover and the upper edge of the container of the cell to a degree such that a predetermined moderate level of pressure due to internal gas buildup within the cell will be sufficient to effectively temporarily deflect the gasket along one or more of the gasket interfaces made with the other cell components thus enabling the gas to vent to the atmosphere. As stated above an additional feature of the resiliently compressible elastomeric sponge gasket of this invention is that for a particular size cell, the gasket need not be made to the size tolerance requirements as generally required of the non-resilient gaskets of the prior art. Thus the resilient elastomeric sponge gasket of this invention will provide an easy to assemble and economical to make venting closure for galvanic cells.

Preferably the resilient elastomeric sponge gasket of this invention should be smooth faced to prevent leakage of gas past the mating surfaces as discussed above. If desired, a light film of grease such as silicone grease or thickened petroleum base grease may be applied at the gasket-container interface, gasket-cover interface and/or gasket-collector-rod interface as a sealing aid, particularly when as cut sponge material is used. In addition, if it is desired to localize the escape path for gas from within the cell, then at preselected areas at the above-described gasket interfaces, a layer of film of asphalt, shellac, fatty polyamide adhesive, etc. could be applied so as to effectively seal the selected interfacial areas and thereby prevent gas from venting along these areas. At the remaining interfacial areas not containing the sealant, the gas could vent. The use of a permanent sealant at preselected locations or areas at the interfaces of the gasket and cell components would provide one means for control over the vent and reseal pressures for the cell.

For most applications the gasket of this invention should have an uncompressed thickness of from about 0.030 inch (0.076 cm) up to about 0.125 inch (0.318 cm) for "AA" size cells and up to about 0.250 inch (0.635 cm) for "D" size cells. Depending on the desired pressure at which the gas is to vent, the elastomeric sponge gasket could be compressed up to about 90%, i.e., to a final thickness about 10% of its original thickness. It is understood that the material of the sponge gasket should be stable in the presence of the other cell components, possess the desired mechanical properties of resilience, and be resistant to hardening and to permanent set.

Because the gaskets of this invention are designed for use in cells that should vent at relatively low pressures, they are admirably suited for use in resealable venting closures for Leclanche, zinc chloride and magnesium dry cells.

The present invention will become more apparent from the following description thereof when considered together with the accompanying drawings which are set forth as being exemplary of embodiments of the present invention and are not intended, in any way, to be limitative thereof and wherein.

Figure 1:
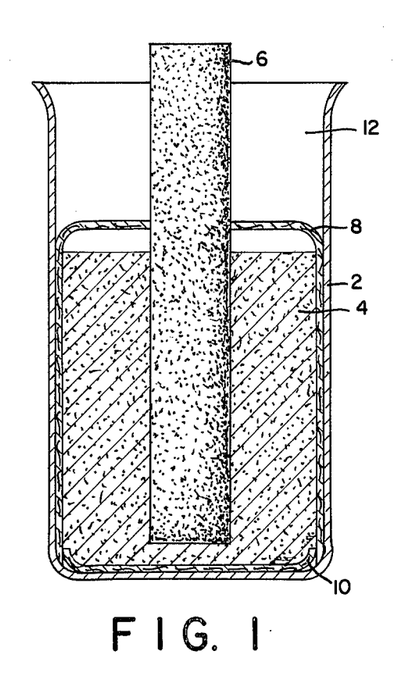
FIG. 1 is a sectional elevation taken through a partially assembled dry cell showing the cathode mix and the cathode collector rod within a container anode.

Referring in detail to FIG. 1, there is shown a partially assembled typical galvanic dry cell including a cylindrical container 2 which is made of an electrochemically consumable metal such as zinc and which serves as the anode for the cell. The cell container 2 includes therein a cathode depolarizer mix cake 4 containing, for example, manganese dioxide, a conductive material such as carbon black and an electrolyte. The cathode depolarizer mix cake 4 could be molded around a central cathode collector rod 6 or the cathode depolarizer mix 4 could be fed into container 2 as a wet mix containing virtually all of the cell's electrolyte and then the cathode collector rod 6 forced down into the center of the depolarizer mix 4. The cathode collector rod 6 could be a carbon rod impregnated with a wax or an organic resin to render it both liquid and gas impermeable. Whether the depolarizer mix is molded into a bobbin type structure in a separate operation prior to cell assembly or fed directly into the container 2 and packed therein, the cathode collector rod 6 is inserted into the depolarizer mix 4 such that its end protrudes through the open end of the container 2. A separator 8 surrounds the cathode depolarizer mix 4 and separates it from the inner side wall of the container 2 while a bottom cup separator 10 separates the depolarizer mix 4 from the bottom inner surface of the container 2. The separator may be a thin film separator, e.g., a thin bibulous paper coated with a paste. The top of the separator 8 is shown folded down on the depolarizer mix 4 thereby leaving the usual air space 12 to accommodate any liquid spew that may be formed on discharge of the cell.

Figure 2:
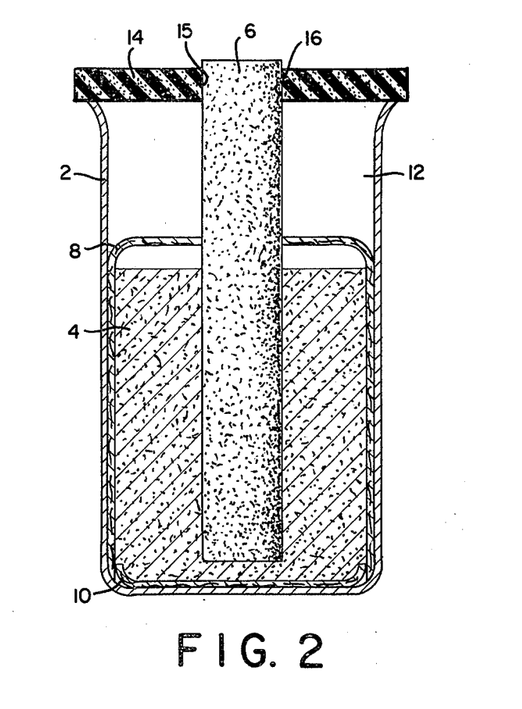
FIG. 2 is a similar view of the partially assembled cell of FIG. 1 except that an elastomeric sponge gasket is shown slid over the cathode collector rod and resting on the edge of the container.

FIG. 2 shows the same numbered components of FIG. 1 with the addition of an elastomeric sponge annular gasket 14 having an opening 16 at its center and being disposed on top of the container 2 with the collector rod 6 projected through said opening 16. Since annular gasket 14 is made of a resilient material, the diameter of opening 16 could be less than the diameter of the cathode collector rod 6 whereupon the gasket 14 could then be forced over and onto rod 6.

Figure 3:
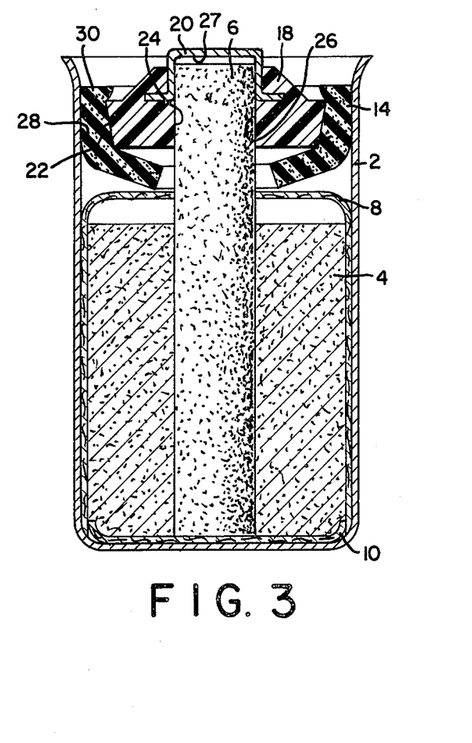
FIG. 3 is a similar view of the partially assembled cell of FIG. 2 except that a cover is shown placed in the container in a manner such that the peripheral segment of the elastomeric sponge gasket is compressed between the outer peripheral vertical edge of the cover and the inner upper wall of the container.

FIG. 3 shows the same numbered components of FIG. 2 with the addition of a plastic closure or cover 18 molded with an electrode terminal cap 20 at its center. The cover 18 should be a rigid structure and would usually be made of plastic. As shown in FIG. 3, the cover side wall 22 is tapered slightly inwardly and has a circular recess or opening 24 defined by a portion of the inner wall 26 of cover 18 and the inner surface 27 of terminal cap 20. In assembling the cover-cap members 18–20 into the cell, the cover-cap members 18–20 are first aligned with the recess 24 over rod 6 and then the members 18–20 are forced downward on top of the elastomeric sponge gasket 14 thereby inserting the gasket 14 and members 18–20 into the container 2. During the insertion of members 18–20 into container 2, the gasket 14 is compressed between the cover side wall 22 and the inner upper wall 28 of container 2. Specifically, the peripheral segment 30 of gasket 14 is compressed between the inner upper wall 28 of container 2 and the cover side wall 22. Optionally, a thin film of grease may be applied to the cover side wall 22, the top and/or bottom surface of the peripheral segment 30, and/or the inner wall 28 of container 2 prior to assembly to aid in the vent sealing of the cover-gasket interface and/or gasket-container wall interface.

Figure 4:
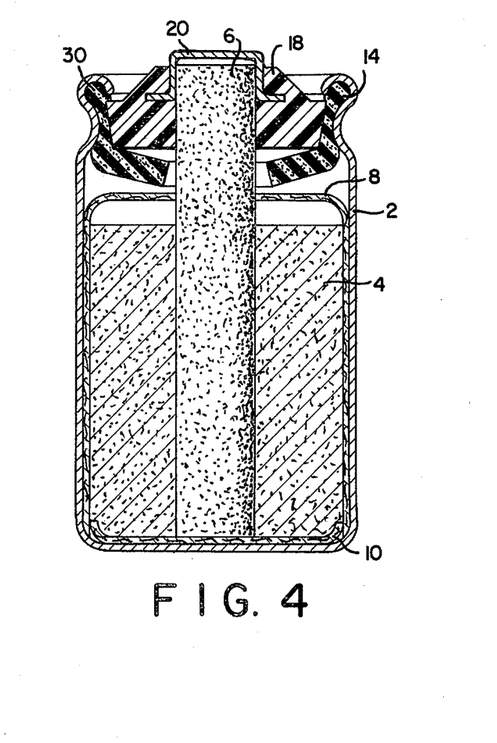
FIG. 4 is a sectional elevation taken through a fully assembled dry cell embodiment of the present invention but without a jacket or label.

FIG. 4 shows the same numbered components of FIG. 3 except that the upper portion of the container 2 has been crimped and radially squeezed into the gasket 14 thereby producing a fully assembled cell, but without a jacket or label.

It is to be understood that the dimensions of the cover 18, gasket 14 and container 2 will determine the degree of compression on the gasket 14 and obviously an artisan in the battery art could select the proper dimensions to avoid a leaking or too-tight seal. By proper selection of the dimensions of the component parts of the cell, the gasket will be compressed sufficiently to insure that internal gas will vent between the gasket-container and/or gasket-cover interface upon reaching a preselected pressure level and then when the pressure decreases below this level, the gasket will automatically return to its original compressed dimension so as to reseal the cell. The degree of compression of the gasket will determine the pressure at which the gas will vent. For most applications, the gasket should be compressed so as to vent gas at pressures in the range of 5 to 75 psi.

Figure 5:
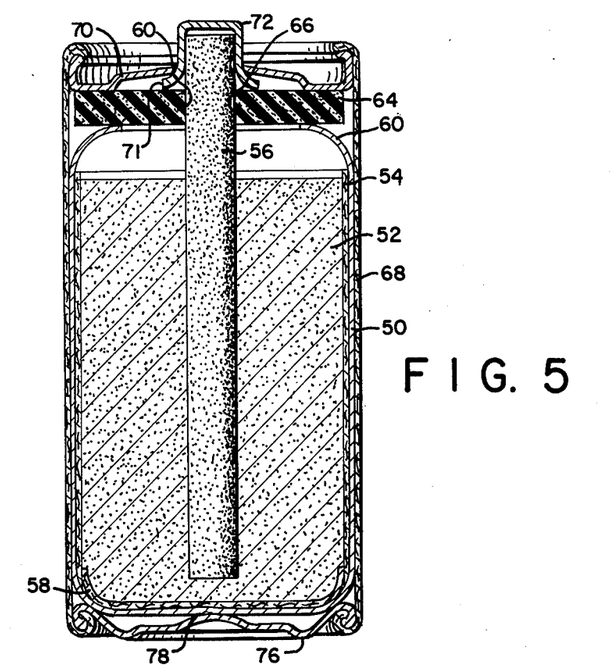
FIG. 5 is a sectional elevation taken through a partially assembled dry cell showing another embodiment of the present invention.

FIG. 5 illustrates another embodiment of a cell in accordance with this invention. Specifically FIG. 5 shows a partially assembled dry cell including a cylindrical conductive container 50, for example, a zinc container, having therein a cathode depolarizer mix cake 52. Centrally disposed in depolarizer mix 52 is a cathode collector rod 56 which protrudes through the open end of the cylindrical container 50. A thin separator 54 surrounds the cathode depolarizer mix 52 and separates the depolarizer mix 52 from the inner side wall of the conductive container 50 while a bottom cup separator 58 separates the depolarizer mix 52 from the inner bottom surface of the container.

With the top edge 60 of container 50 curled or crimped inwardly to provide a support flange, an elastomeric sponge annular gasket 64 having an opening 66 at its center is disposed on top of the flange of container 50 with the collector rod 56 projecting through opening 66. Since annular gasket 60 is made of a resilient material, the diameter of opening 66 could be less than the diameter of the cathode collector rod 56 whereupon gasket 64 could then be forced over and onto cathode collector rod 56. The interface 60 of rod 56 and gasket 64 would thus provide a good low pressure resealable venting passage for gas from within the cell. Optionally, a thin film of a grease may be applied to the upper portion of the collector rod 56 and/or the inner wall of opening 66 in gasket 64 prior to assembly to aid in the vent sealing of the gasket-rod interface.

The cell proper (i.e., raw cell) with the gasket 64 seated on the inwardly disposed top edge flange of container 50, is encased within an outer cell finish assembly including an outer tubular non-corrodible jacket 68 suitably made of a fibrous material, such as kraft paper. The upper end of the tubular jacket 68 extends beyond the gasket 64 and is crimped over the outer peripheral edge of an annular metallic top cover plate 70. Prior to engaging jacket 68 to cover plate 70, a metallic electrode terminal cap 72 is positioned over cathode collector rod 56 and is provided with an outwardly flanged lower end 71 that rests upon gasket 64. The outer peripheral edge of a metallic bottom disc 76, in electronic contact with the bottom surface 78 of conductive container 50, is locked in engagement with the lower end of tubular jacket 68. This bottom disc 76 serves as one of the electrode terminals of the cell.

Figure 6:
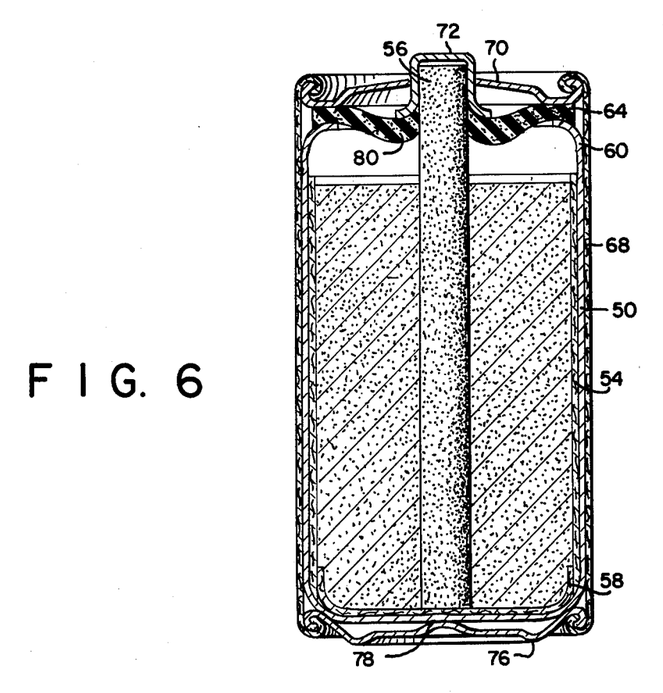
FIG. 6 is a sectional elevation taken through a fully assembled dry cell of the type shown in FIG. 5.

FIG. 6 shows the same numbered components of FIG. 5 except that the gasket 64 is shown compressed between the top cover plate 70 and the top edge 60 of container 50. Specifically, in completing the assembly of the cell shown in FIG. 5, the terminal cap 72 is pushed into the cell thereby further inserting the cathode collector rod 56 and the inner segment 80 of gasket 64 within the cell. Note that segment 80 of gasket 64 is slightly distorted during this step. During the final curling and locking of the cover plate 70 to the jacket 68, cover plate 70 is caused to bear down upon the gasket 64 thereby compressing the gasket 64 between the inward flange of container 50 and said cover plate 70. This compression of the elastomeric sponge gasket 64 between the container 50 and cover plate 70 provides a resealable venting closure for the cell that will permit gas in the order of 5 psi and above to escape to the atmosphere past the top curl.

If desired, a thin film of grease may be applied to the bottom contact surface of cover plate 70, the top wall of the flange 60 of the container 50 and/or the top and/or bottom outer surface of gasket 64 prior to assembly to aid in the vent sealing of the cover-gasket interface and/or gasket-container interface for reason discussed above. It is to be understood that the gasket 64 should be compressed sufficiently to insure that gas within the cell will vent between the gasket-container interface, the gasket-cover interface, and/or the gasket-collector rod interface after a predetermined amount of gas pressure buildup.

Figure 7:
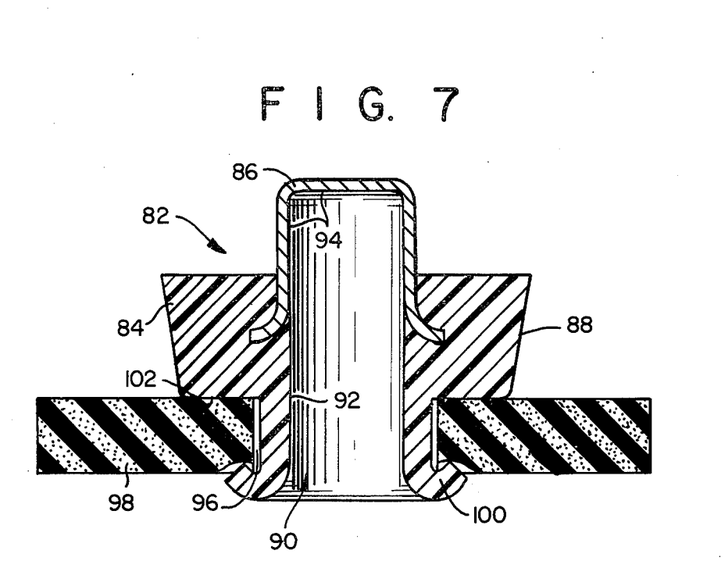
FIG. 7 is a sectional elevation taken through a cover-gasket assembly for use in this invention.

FIG. 7 shows a cover-gasket assembly 82 comprising a plastic closure or cover 84 molded with an electrode terminal cap 86 at its center. As shown in FIG. 7, the cover sidewall 88 is tapered slightly inwardly and has a circular recess or opening 90 defined by a portion of the inner wall 92 of cover 84 and the inner surface 94 of terminal cap 86. At the lower portion of the outer sidewall 88 is a groove or recess 96 into which is secured an annular sponge gasket 98. Prior to assembling the gasket 98 to the cover 84, the lower segment 100 of the cover extends downwardly so that the outside diameter of depending segment 100 is equal to or less than the inner diameter of gasket 98. Once the gasket 98 is slid over the depending segment 100 and rests against wall 102 of cover 84, the lower extremity of segment 100 is crimped into gasket 98 thereby securing gasket 98 to cover 84.

Figure 8:
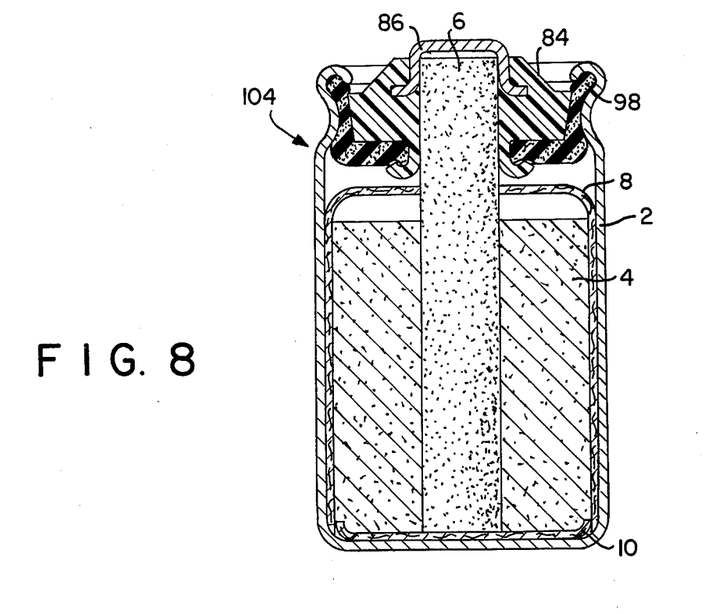
FIG. 8 is a sectional elevation taken through a fully assembled dry cell embodiment of the present invention employing the cover-gasket assembly of FIG. 7.

FIG. 8 shows a fully assembled cell (but without a jacket or label) employing the raw cell components shown in FIG. 1 and the cover-gasket assembly shown in FIG. 7, all of said components being identified with the same numerical references as used in FIGS. 1 and 7. Specifically, the fully assembled cell 104 shown in FIG. 8 is assembled by aligning the opening 90 of the cover-gasket assembly 82 over the cathode collector rod 6 and then forcing the assembly 82 into container 2 whereupon the gasket 98 is compressed between the sidewall 88 of cover 84 and the inner upper wall of container 2 in a manner as described in conjunction with FIG. 3. Thereafter, the upper portion of container 2 is crimped and radially squeezed into gasket 98 producing a fully assembled cell 104 as shown in FIG. 8.

Figure 9:
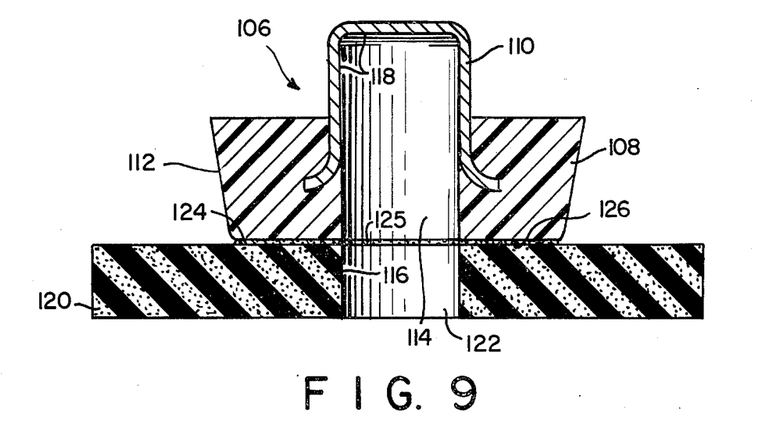
FIG. 9 is a sectional elevation taken through another cover-gasket assembly for use in this invention.

FIG. 9 shows another embodiment of a cover-gasket assembly 106 comprising a plastic closure or cover 108 molded with an electrode terminal cap 110 at its center. As shown in FIG. 9, the cover-gasket 106 has an outer sidewall 112 and a circular recess or opening 114 defined by a portion of inner wall 116 of cover 108 and inner surface 118 of terminal cap 110. Disposed at the lower end of cover 108 is an annular sponge gasket 120 having an opening 122 equal to or larger than the opening 114 of cover 108 so as not to block opening 114. The upper inner surface 124 of gasket 120 is secured to the lower surface 126 of cover 108 by conventional means such as by using a suitable adhesive material 125.

Figure 10:
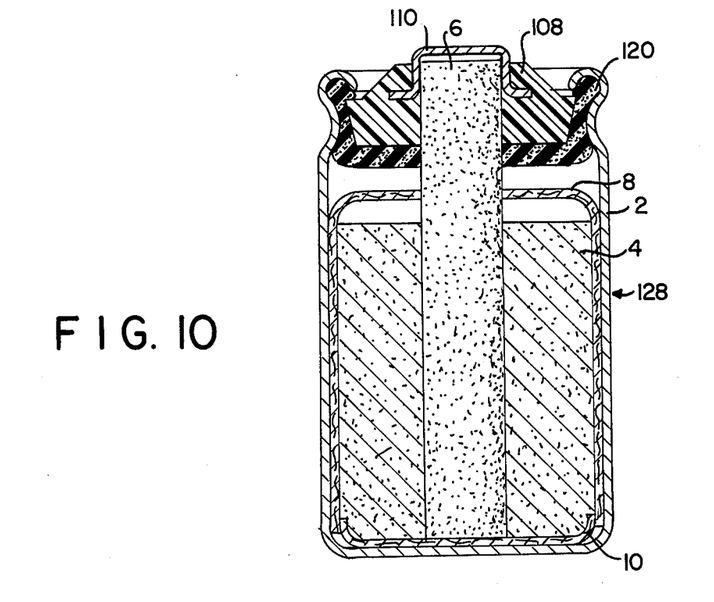
FIG. 10 is a sectional elevation taken through a fully assembled dry cell embodiment of the present invention employing the cover-gasket assembly of FIG. 9.

FIG. 10 shows a fully assembled cell (but without a jacket or label) employing the raw cell components shown in FIG. 1 and the cover-gasket assembly shown in FIG. 9, all of said components being identified with the same numerical references as used in FIGS. 1 and 9. Specifically, the fully assembled cell 128 shown in FIG. 10 is assembled by aligning the opening 114 of the cover 108 over the cathode collector rod 6 and then forcing the assembly 106 into container 2 whereupon the gasket 120 is compressed between the sidewall 112 of cover 108 and the inner upper wall of container 2 is a manner as described in conjunction with FIG. 3. Thereafter, the upper portion of container 2 is crimped and radially squeezed into gasket 120 producing a fully assembled cell 128 as shown in FIG. 10.

EXAMPLE 1

Thirty five miniature cylindrical zinc chloride dry cells, each having an outer diameter of 0.436 inch (1.107 cm), an inner diameter of 0.410 inch (1.05 cm) and a height of 1.09 inches (2.769 cm), were constructed as shown in FIGS. 1 to 4. The anode of each cell consisted of a zinc cylindrical container having therein a cathode depolarizer mix composed of manganese dioxide, carbon black and an electrolyte composed of aqueous zinc chloride. A thin, bibulous separator paper surrounded the cathode depolarizer mix thereby separating the mix from the internal wall of the zinc container. A carbon collector rod having a diameter of 0.091 inch (0.23 cm) was disposed within the center of the mix with its top portion projecting above the mix. A closed cell neoprene sponge rubber gasket, similar to SC 42 per A.S.T.M. D-1056, and measuring 0.5 inch (1.28 cm) outside diameter, 0.063 inch (0.160 cm) inside diameter and 0.063 inch (0.160 cm) thick, was force slid on the projected end of the cathode collector rod of each cell. A plastic closure having an outside diameter of 0.355 inch (0.908 cm) and molded with a terminal cap as shown in FIG. 3 (members 18–20) was placed on top of the neoprene gasket and then forced into the zinc container thus compressing the neoprene gasket between the upper wall of the container and the outer wall of the closure. The top of the zinc container was then locked in engagement with the neoprene gasket by the conventional crimping and necking technique. A measurement of the neoprene gasket at the necked-in area of the container revealed that it had been compressed by about 85%.

The cells so constructed were then stored at 45° C. for six months along with identical size zinc chloride dry cells finished with the standard nonresealable seal in which the zinc can is necked under and crimped over a molded plastic cover member which is sealed to the carbon collector rod with asphalt. The test cells exhibited equivalent or slightly improved current maintenance throughout the testing period. The static sealing performance test showed that cells employing seals of this invention were equal to or better than non-resealable commercial cells.

EXAMPLE 2

Seventy two "AA" size cells, 0.526 inch (1.34 cm) outside diameter and 1.955 inches (4.79 cm) long were constructed as shown in FIG. 6. The components of the cells were essentially the same as used in Example 1 with the main differences being the two piece cover and the encasement of the raw cell in an outer jacket as discussed in conjunction with FIGS. 5 and 6.

Each of the cells so constructed employed a closed cell neoprene sponge gasket as in Example 1 which prior to assembly in the cell measured 0.5 inch (1.27 cm) outside diameter, 0.063 inch (0.160 cm) inside diameter, and 0.063 inch (0.160 cm) thick. The gasket was compressed at the seal area (between the cover and the zinc flange) to about 15% of its original thickness. The outer surface of the curl of the zinc container was greased with a film of petroleum grease and the interface of the gasket and collector rod was also given a film of petroleum grease. In addition, the collector rod had been fully impregnated with scale wax thereby rendering it non-porous so that the only venting paths were between the container curl and the gasket, and the collector rod and the gasket.

Twenty four of the test cells were then stored at 71° C. for one week along with prior art zinc chloride cells which were assembled with snap-on rim vent subseals as taught by U.S. Pat. No. 3,802,923. At this temperature zinc chloride cells evolve gas fast enough to rupture ordinary poured asphalt seals and the like even with porous cathode collector rods. The result of the test showed that the test cells made in accordance with this invention gave service maintenance on discharge testing generally equal to the cells employing the rim vent seal.

Forty eight test cells were stored for three months at 45° C. The service maintenance on discharge testing of these cells were then compared to cells employing the rim vent seal and stored under identical conditions. The result of this comparison showed that the test cells of this invention were equal in performance to the rim vent seal cells.

The result of this comparison test showed that the resealable seals of this invention can be economically produced without sacrificing the static (long time, low pressure) seal quality and that compared with expensive and more complex commercial resealable vent cells (rim vent), the cells employing the venting seal closures of this invention will perform equal to such commercial cells with respect to the critical high temperature shelf behavior. Additional benefits of the invention are as follows:

1. Seal compactness allows more room for active mix.
2. Assembly tolerances are not as critical as in the vent seals of the prior art.

What is claimed is:

1. In a galvanic cell comprising a container having an open end and an inner disposed anode, a cathode within said container, a porous separator disposed between said anode and said cathode, an electrolyte disposed within said container and a cover for said container; the improvement being a resealable vent closure comprising a gas-impermeable, resiliently compressible elastomeric sponge gasket compressed between the upper wall of the container and the cover.

2. In the galvanic cell of claim 1 wherein the container is made of a consumable anode material and thus functions as the anode of the cell.

3. In the galvanic cell of claim 2 wherein a film of grease is disposed at least along a portion of the gasket and cover interface.

4. In the galvanic cell of claim 2 wherein a film of grease is disposed at least along a portion of the gasket and container interface.

5. In the galvanic cell of claim 4 wherein a film of grease is disposed at least along a portion of the gasket and cover interface.

6. In the galvanic cell of claim 2 wherein a film of sealant is disposed at least along a portion of the gasket and cover interface.

7. In the galvanic cell of claim 2 wherein a film of sealant is disposed at least along a portion of the gasket and container interface.

8. In the galvanic cell of claim 7 wherein a film of sealant is disposed at least along a portion of the gasket and cover interface.

9. In the galvanic cell of claim 1 wherein the cathode is formed around a cathode collector rod and wherein the resilient compressible elastomeric sponge gasket has an opening at its center through which the cathode collector rod passes and contacts thus providing a resealable vent path at the interface of the gasket and cathode collector rod.

10. In the galvanic cell of claim 9 wherein a film of grease is disposed at least along a portion of the interface of the gasket and cathode collector rod.

11. In the galvanic cell of claim 9 wherein a film of grease is disposed at least along a portion of the gasket and cover interface.

12. In the galvanic cell of claim 9 wherein a film of grease is disposed at least along a portion of the gasket and container interface.

13. In the galvanic cell of claim 9 wherein a film of sealant is disposed at least along a portion of the interface of the gasket and cathode collector rod.

14. In the galvanic cell of claim 9 wherein a film of sealant is disposed at least along a portion of the gasket and cover interface.

15. In the galvanic cell of claim 9 wherein a film of sealant is disposed at least along a portion of the gasket and container interface.

16. In the galvanic cell of claim 1 wherein the top of the container is curled inward forming a substantially horizontal flange and wherein a portion of the gasket is compressed between the upper surface of the flange and the outer bottom surface of the cover.

* * * * *